Dec. 23, 1941.  C. F. PURDY  2,267,421
FENDER SHIELD AND ASSEMBLY
Filed July 13, 1940  3 Sheets-Sheet 1
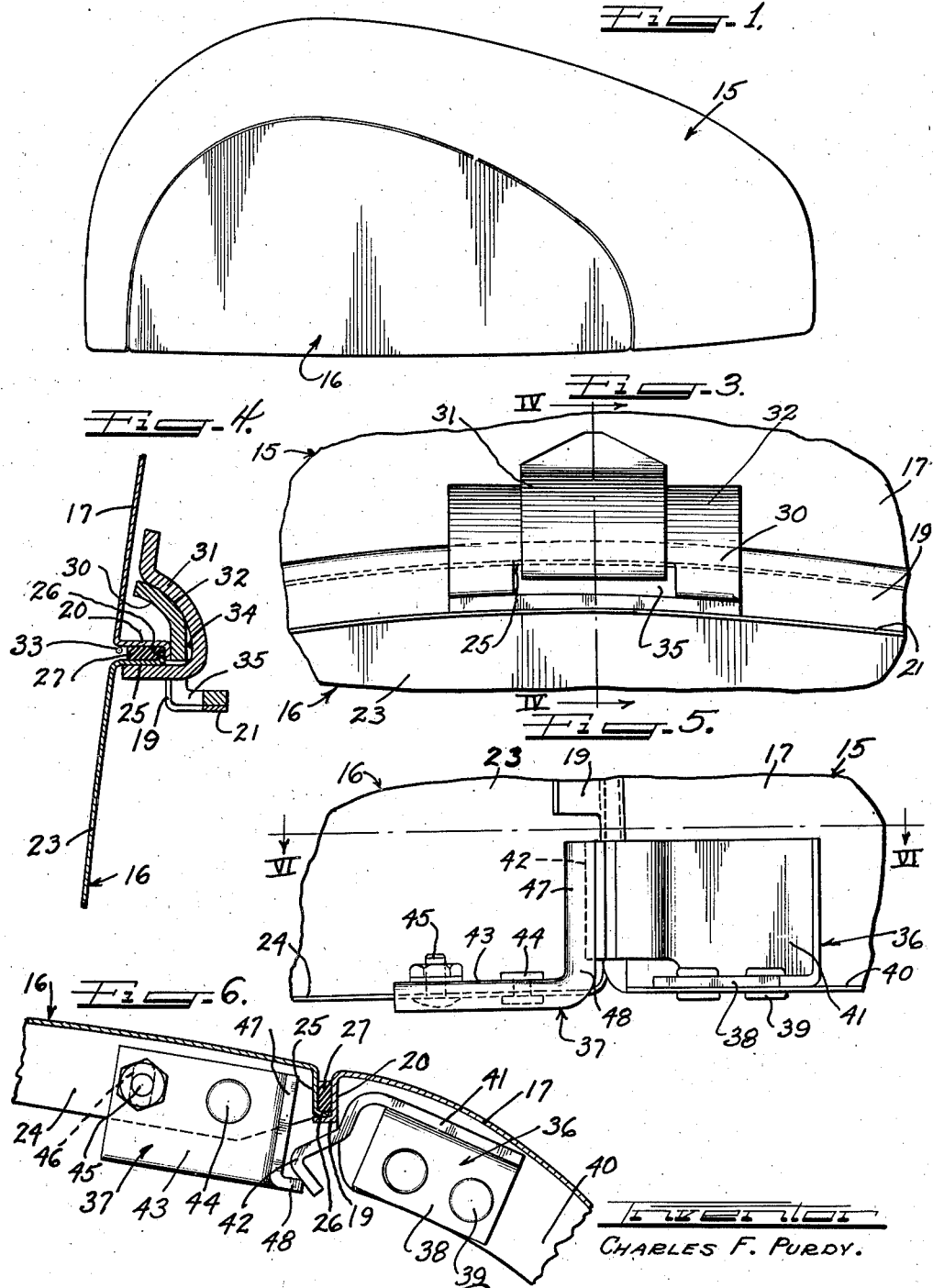
Inventor
CHARLES F. PURDY.

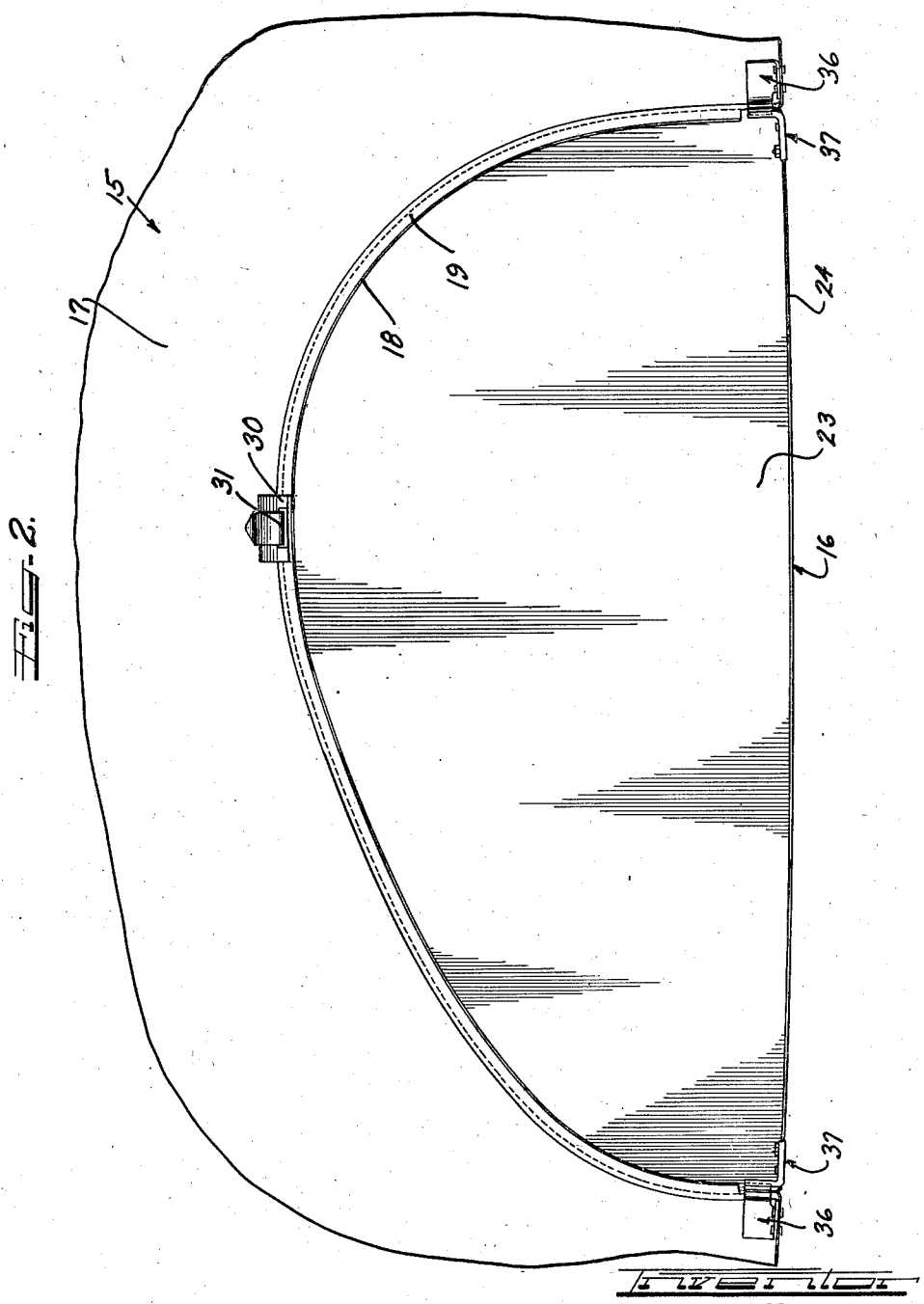

Dec. 23, 1941.  C. F. PURDY  2,267,421
FENDER SHIELD AND ASSEMBLY
Filed July 13, 1940  3 Sheets-Sheet 3
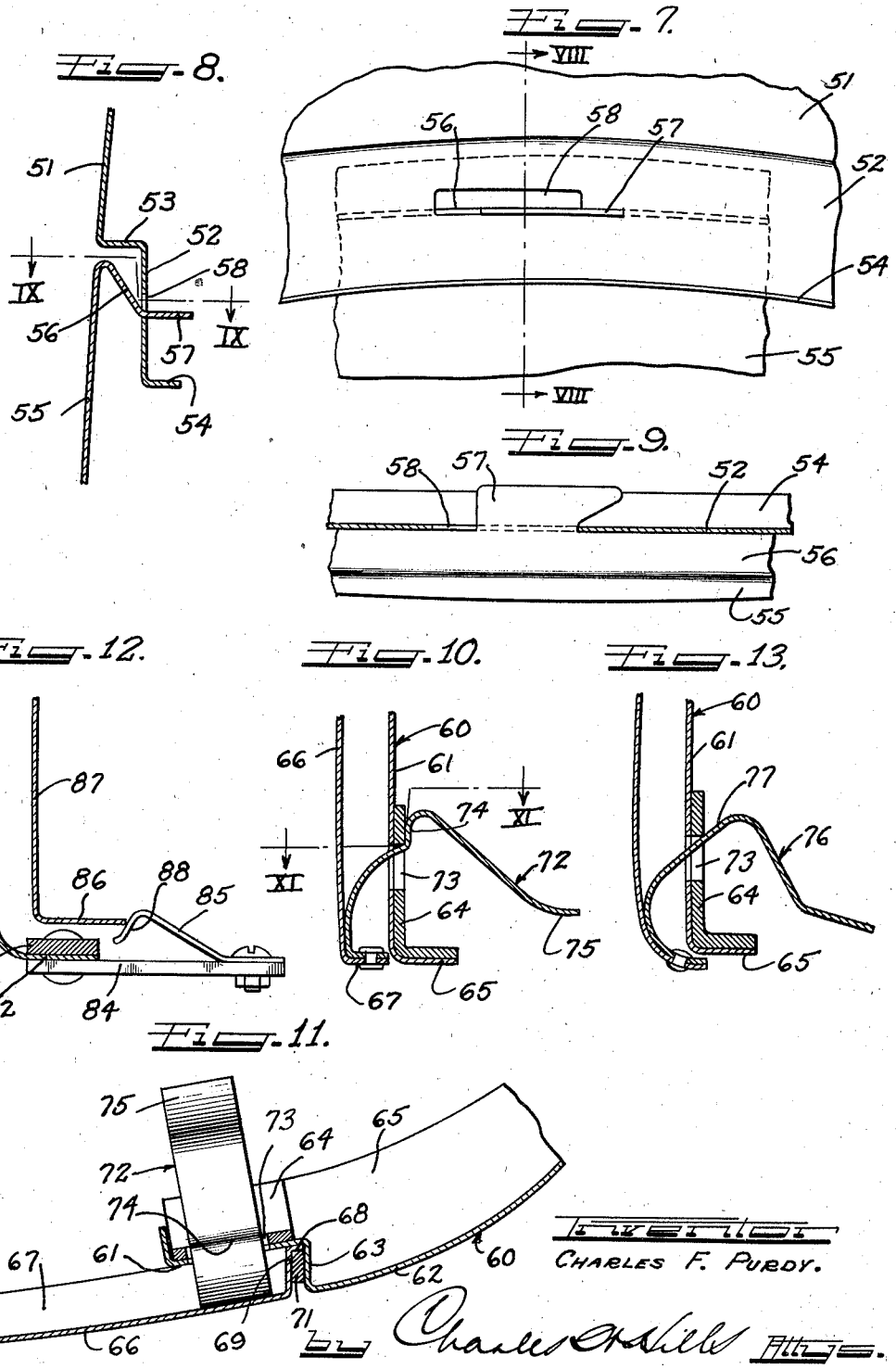
Inventor
CHARLES F. PURDY.

Patented Dec. 23, 1941

2,267,421

UNITED STATES PATENT OFFICE 2,267,421

FENDER SHIELD AND ASSEMBLY

Charles F. Purdy, Detroit, Mich., assignor to Houdaille-Hershey Corporation, Detroit, Mich., a corporation of Michigan Application July 13, 1940, Serial No. 345,272

11 Claims. (Cl. 280—153)

This invention relates to means for covering or closing the wheel access opening in the fender or side of a vehicle. In particular, my invention relates to fender shields or fender skirts, as such devices are known when used in connection with a fender, but this invention is equally applicable to automotive vehicles having a body wide enough to enclose the wheels without the use of fenders and in which the wheel access openings are in the sides of the body itself. Bodies of this type are to be found today only among commercial vehicles, such as trucks and buses, and a few have been built for private vehicles, and I wish it to be expressly understood that this invention is equally applicable to such bodies on commercial and private vehicles as well as to fenders. Therefore, while I have referred to my invention as a fender shield, it is to be clearly understood that this term includes covers for wheel access openings in the side of a body or other wheel enclosing member as well as for wheel access openings in fenders.

This invention relates particularly to ornamental fender shields or skirts of the type which fit into a wheel access opening in a vehicle fender or body so that the outside of the fender skirt is substantially flush with the outside of the fender or body. However, the invention may be employed with a fender shield of the type fitting on the outside of and overlapping the side of the vehicle fender or body, and it is to be clearly understood that this construction is included within my invention even though I have shown only the preferred form in which the fender shield fits into the wheel access opening and is flush.

One of the principal objects of the present invention is to provide a simple and rugged mechanism for supporting a fender shield in a wheel access opening and for permitting it to be readily removed therefrom when desired.

Another object of this invention is to provide a fender and fender shield assembly in which the fender and fender shield are flush with each other on the outside and in which the edge of the fender shield fits against a recessed flange on the fender.

Another object of this invention is to provide a fender and fender shield assembly in which the fender shield is secured to the fender by a simple mechanism which is economical to manufacture and easy to operate.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a side elevational view of a vehicle fender having one embodiment of my novel ornamental fender shield mounted thereon;

Figure 2 is an inside elevational view of the form of the invention shown in Figure 1, as seen from the inside of the fender, showing the back or inner side of the fender and fender shield as they appear when the fender shield is mounted on the fender;

Figure 3 is an enlarged detail view of a portion of the mounting means shown in Figure 2;

Figure 4 is a section taken on the line IV—IV of Figure 3 and looking in the direction of the arrows;

Figure 5 is an enlarged detail view of another portion of the mounting means shown in Figure 2;

Figure 6 is a horizontal sectional view taken on the line VI—VI of Figure 4 and looking down in the direction of the arrows;

Figure 7 is an enlarged detail view similar to Figure 3 but showing a modified form of the invention;

Figure 8 is a cross section taken on the line VIII—VIII of Figure 7 and looking in the direction of the arrows;

Figure 9 is a horizontal section taken on the line IX—IX of Figure 8 and looking down in the direction of the arrows;

Figure 10 is a detail cross-sectional view showing a modified form of latching means for the bottom of the fender shield;

Figure 11 is a horizontal sectional view taken on the line XI—XI of Figure 10 and looking down in the direction of the arrows;

Figure 12 is a detail cross-sectional view, similar to Figure 10, and showing another modified form of latching means; and Figure 13 is another detail cross-sectional view, similar to Figure 10, and showing still another modified form of latching means.

The embodiment of the invention illustrated in Figures 1 to 6 comprises a streamlined fender 15 which is specially constructed to receive the fender shield 16. For this purpose, the depending sidewall 17 of the fender 15 is formed with a wheel access opening 18 of the same shape as but slightly smaller than the fender shield 16, and the opening 18 is surrounded by a flange 19 set back or recessed from the main portion of the sidewall 17 of the fender, the flange 19 forming a seat for the edge of the fender shield 16. The flange or seat 19 around the wheel access opening 18 is connected to the main portion of the depending sidewall 17 by an intermediate web or flange 20 and is reinforced by a marginal flange 21 along its inner edge.

The fender shield 16 comprises a sheet metal panel 23, which forms the entire closure for the wheel access opening 18. The lower edge of the panel 23 is bent back horizontally to form a flange 24 extending the entire length of the panel and serving to stiffen the lower portion of it. Around the upper edge, the fender shield panel 23 is formed with an intermediate flange 25 extending straight back and having a narrow outwardly extending marginal flange 26 along its entire edge. As may be seen from Figures 4 and 6, the marginal flange 26 on the fender shield panel 23 seats upon the main flange or seat 19 on the fender, and the intermediate flanges 20 and 25 on the fender and the fender shield panel are of such widths that the face of the fender shield panel 23 lies in line with the sidewall 17 of the fender.

The space between the two intermediate flanges 20 and 25 is occupied by a rubber edging 27 which is cemented, stapled, or otherwise secured to the intermediate flange 25 on the fender shield panel 23. If desired, the marginal flange 26 on the edge of the fender shield panel may be omitted and a rubber edging provided to embrace the rearwardly projecting flange 25 on the fender shield panel and seat against the main flange 19 on the fender, the construction being similar to that disclosed in the Arthur P. Fergueson patent application No. 248,389, filed December 30, 1938, and assigned to the same assignee as the present invention.

The entire weight of the fender shield is supported and its upper portion is held in place with respect to the fender by means of an arrangement of interlocking brackets 30 and 31 illustrated in Figures 3 and 4. One bracket 30 is seated upon and spot welded to the rear and upper surfaces of the flange or seat 19 and the marginal seat 21 of the fender at the top of the wheel access opening 18, and the surface of the bracket 30 is formed to provide a convex surface 32 having a substantially constant radius of curvature located in back of the fender and above the wheel access opening and facing up and to the rear, the center of curvature 33 of the surface 32 being located preferably within the recess into which the fender shield 16 fits and either approximately in line with the main portions of the sidewall 17 of the fender and the fender shield panel 23 or else on the outside of these.

The bracket 31, which is spot welded or otherwise secured to the intermediate flange 25 on the fender shield panel 23, projects in back of the bracket 30 on the fender and is formed with a concave surface 34 that fits slidably on the convex surface 32 of the stationary bracket 30. The two curved surfaces 32 and 34 permit the fender shield 16 to be swung around the center 33 as if it were hinged there. When the fender shield 16 is swung down to its normal mounted position, the curved surfaces 32 and 34 on the brackets 30 and 31 are engaged and function to support the fender shield and to hold its upper portion in against the seat 19 on the fender, but, when the fender shield 16 is swung out and up, the concave surface 34 on the moving bracket 31 swings around out of engagement with the convex surface 32 on the fixed bracket 30, permitting the two brackets 30 and 34 to be disengaged and the fender shield 16 to be removed completely from the fender.

It will be noted that the fixed bracket 30 is substantially longer than the moving bracket 31 on the fender shield and is provided with an aperture 35 through which the moving bracket 31 extends. Although this is the preferred construction, it will be obvious to the skilled mechanic that the bracket 31 on the fender shield could be formed to extend around under the entire stationary bracket 30, particularly if curved surfaces having a larger radii were employed. The construction shown in the drawings, however, is the preferable one as it is more compact.

The bottom of the fender shield 16 is held at each end by a fixed bracket 36 secured to the fender and a movable end bracket 37 secured to the fender shield 16. The fixed bracket 36 comprises a base portion 38 secured by rivets 39 to a flange 40 projecting back at the bottom of the fender. The body portion 41 of the fixed bracket 36 lies in back of the sidewall 17 of the fender and carries a nose portion 42 that projects out behind the wheel access opening.

The movable bracket 37 is formed in the shape of an angle having one leg or base 43 secured to the flange 24 at the bottom of the fender shield panel 23 by means of a rivet 44 and a bolt 45. The rivet 44 serves as a pivot about which the bracket 37 can swing to a limited extent, this swinging being permitted by the fact that the bolt 45 extends through a slot 46 in the base 43 of the bracket, and the bracket 37 is held in any desired adjusted position by tightening the nut on the bolt 45. The other leg 47 of the bracket 37 extends up beside the nose 42 of the fixed bracket 36, and both legs 43 and 47 are reinforced by a flange 48. The flange 48 extends in back of the nose 42 on the fixed bracket 37 and holds the lower part of the fender shield 16 in against its seat 19 on the fender.

The fender shield 16 is removed, when desired, by forcibly pulling the lower part out from the fender, the resiliency of the fender shield 16 and of the sidewall 17 of the fender permitting the flange 48 on the bracket 37 on the fender shield to snap past the nose 42 of the fixed bracket 36. The fender shield 16 is then swung up far enough to permit the bracket 31 at the top of the fender shield to be disengaged from the bracket 30 on the fender, whereupon the fender shield 16 may be entirely removed. In mounting the fender shield, the opposite procedure is followed, the bracket 31 at the top of the fender shield being first engaged, the fender shield then being swung down into position, and the flanges 48 on the brackets 37 at the bottom of the fender shield snapped into position with respect to the fixed brackets 37.

In order to secure a tighter fit of the fender shield 16 on the fender 15, the fender shield panel 23 may be made slightly curved with respect to the sidewall 17 of the fender so that it will be sprung or strained slightly when in place. This detail of construction, however, is not essential and need not be described in detail, especially as it is fully described in the Fergueson and Gould Patent No. 2,196,493, issued April 9, 1940.

Another form of means for holding the top of the fender shield in against the fender and for supporting the weight of the fender shield is illustrated in Figures 7, 8 and 9. In this modified construction, the depending sidewall 51 of the fender is formed with a rearwardly offset flange or seat 52 connected to the main portion 51 of the fender sidewall by an intermediate flange 53 and reinforced at its edge by a marginal flange 54. The edge of the fender shield panel 55 is folded in to form a marginal flange 56 and is provided with a rearwardly projecting hook 57 formed integrally therewith. The hook 57 extends through an opening 58 in the main flange 52 on the fender sidewall 51 and lies in a horizontal plane so that it can be disengaged by sliding the fender shield panel 55 to one side and then moving it outwardly.

A modified mechanism for latching the bottom of the fender shield in place is illustrated in Figures 10 and 11. In this construction, the fender 60 is constructed with a relatively wide main flange or fender shield seat 61 offset back from the sidewall 62 of the fender and connected thereto by an intermediate flange 63. The lower portion of the main flange 61 is reinforced by a doubling piece 64 spot welded to it and to the flange 65 along the bottom of the fender.

The fender shield panel 66 is formed with a flange 67 along its lower edge and with a rearwardly offset flange 68 connected to the main portion of the panel 66 by an intermediate flange 69 and adapted to seat on the main flange or seat 61 of the fender. A rubber edging 71, similar to the rubber edging 27 on the form of the invention illustrated in Figures 1 to 6, is secured to the outside of the flange 69 on the fender shield panel 66.

The latch in this form of the device is formed by a strip of spring steel 72 riveted to the flange 67 at the bottom of the fender shield panel 66 and extending through an aperture 73 in the fender flange 61 and doubling piece 64. The spring latch 72 is formed as shown in Figure 10 to provide a shoulder 74 adapted to engage the back of the doubling piece 64 above the aperture 73 and to also provide a rearwardly projecting portion 75 by means of which the spring 72 may be flexed so as to disengage the shoulder 74 and permit the fender shield panel 66 to be removed.

A form of latch generally similar to that shown in Figures 10 and 11 is illustrated in Figure 13. In this form of latch, the spring 76 is formed with a sloping portion 77 adapted to engage the edge of the aperture 73 in the doubling piece 64 and fender side wall 61 instead of being formed with a shoulder 74 as in the construction shown in Figures 10 and 11.

Still another form of latch to be employed for holding in the lower corners of the fender shield is illustrated in Figure 12. In this form of the invention, the fender shield panel 81 is formed with a horizontally extending flange 82 along its base and is reinforced by a bar 83 riveted on top of the base flange 82. At each end of the fender shield, a rearwardly projecting bracket 84 is secured to the base flange 82 and reinforcing bar 83 and carries a spring latch member 85 adapted to engage the rear edge of the base flange 86 on the fender 87. The angle of the portion 88 of the latch member 85 which engages the fender flange 86 is chosen so that considerable force will be required to pull the fender shield panel 81 away from the fender 87. If desired, the fender-engaging portion 88 of the latch 85 can be made steep enough so that it will be necessary to reach in under the fender and manually disengage the latch, thus providing an extremely secure attachment of the fender shield to the fender.

While I have shown only one principal form of my invention, and some modifications thereof, it is of course to be understood that these are shown only by way of example and that the invention can be carried out in other ways, which will occur to the skilled mechanic having the present disclosure before him. My invention, therefore, includes not only what I have shown and described, but any other construction falling within the true spirit and scope of the invention and lying within the scope of the appended claims.

I claim as my invention:

1. In a vehicle, a depending side wall having a wheel access opening therein, the margin of said wall around said opening being set back from the main portion of said wall to form a recessed seat, an aperture at the top of said opening, a panel closing said opening and having the edge thereof seated on said seat, said panel having a hook extending through said aperture for supporting the weight of said panel and holding the upper portion thereof against said seat, the entire portion of said hook projecting through said aperture being located above the bottom of said aperture to permit the insertion of said hook into said aperture for supporting the weight of said panel without any lowering of the upper edge of said panel whereby the gap between said upper edge and the main portion of said side wall when said panel is in place will be a minimum.

2. In a vehicle, a depending side wall having a wheel access opening therein, fixed supporting means behind said side wall at the top of said opening, said fixed supporting means having a fixed convex upper supporting surface facing up and back, a panel for closing said opening, and a supporting member rigid with said panel, said supporting member being constructed and arranged to extend up in back of and over said fixed supporting means and engage said fixed supporting surface.

3. In a vehicle, a depending side wall having a wheel access opening therein, fixed supporting means secured to and spaced behind said side wall at the top of said opening, said fixed supporting means having a fixed convex supporting surface extending upwardly and toward said depending side wall, a panel for closing said opening, a supporting member rigid with said panel, said supporting member being constructed to mate with said convex supporting surface and arranged to extend up in back of and over said fixed supporting means and engage said fixed convex supporting surface for supporting the weight of said panel and holding the upper portion thereof in against said side wall, and means at the lower corners of said panel for holding the lower portion thereof in against said side wall.

4. In a vehicle, a depending side wall having a wheel access opening therein, a bracket fixed to said side wall at the top of said opening and having a convex bearing portion, a panel covering said opening, and a hook fixed to said panel and extending up in back of and forward over said bearing portion of said bracket, said hook having a concave undersurface arranged to be slidingly seated on said convex bearing portion.

5. In a vehicle, a depending side wall having a wheel access opening therein, a bracket fixed to said side wall at the top of said opening and having a convex upper bearing portion, a panel covering said opening, a hook fixed to said panel and extending up in back of and forward over said bearing portion of said bracket for supporting the weight of said panel and holding the upper portion thereof in against said side wall, said hook having a concave undersurface arranged to be slidingly seated on said convex bearing surface, and means at the lower corners of said panel for holding the lower portion thereof in against said side wall.

6. In a vehicle, a depending side wall having a wheel access opening therein, a bracket fixed to said side wall at the top of said opening and having a bearing portion, a panel covering said opening, and a hook fixed to said panel and extending up in back of and forward over said bearing portion of said bracket, the engaging surfaces of said hook and said bearing portion of said bracket having a substantially constant radius of curvature and having an axis of curvature lying substantially in said side wall at substantially the top of said opening.

7. In a vehicle, a depending side wall having a wheel access opening therein, a bracket fixed to the back of said side wall at the top of said opening and having a bearing portion, a panel covering said opening, and a hook fixed to said panel and extending up in back of and forward over said bearing portion of said bracket, the engaging surfaces of said hook and said bearing portion of said bracket being curved with a substantially constant radius of curvature and having a common horizontal axis parallel to the plane of said panel and located slightly above the upper edge thereof.

8. In a vehicle, a depending side wall having a wheel access opening therein, said opening being surrounded by a flange parallel to and offset in back of the main portion of said side wall, and a connecting flange extending between said parallel offset flange and said side wall, a removable panel seated against said flange and covering said opening, a bracket fixed to the back of said side wall above said opening and having an upwardly and rearwardly facing convex supporting surface of substantially constant radius of curvature whose axis of curvature extends parallel to said side wall above said panel, a hook fixed to said panel and having a concave cylindrical surface complementary to said convex supporting surface slidably engaging said convex surface on said bracket, and releasable means at the lower corners of said panel for holding the lower part of said panel against said flange, said axis of curvature being located slightly above and in from the outer top junction point of said side wall and said connecting flange, whereby said panel is pulled tightly against said connecting flange as well as said offset flange.

9. In a vehicle, a depending side wall having a wheel access opening therein, said opening being surrounded by a flange parallel to and offset in back of the main portion of said side wall, said side wall having rearwardly projecting flanges along the bottom at each side of said opening, a removable panel seated against said offset flange and covering said opening, said panel having a rearwardly projecting flange along the bottom, a bracket fixed to the back of said side wall above said opening and having an upwardly and rearwardly facing convex supporting surface whose axis of curvature extends parallel to said side wall above said panel, a hook fixed to said panel and extending up behind and over said supporting surface on said bracket, said hook having a surface slidably engaging said supporting surface for transferring the weight of said panel to said side wall and for holding the upper portion of said panel seated against said offset flange, a pair of one-piece brackets fixed to said flange at the bottom of said side wall at the sides of said opening and having rounded portions projecting behind said wheel access opening, and a second pair of one-piece brackets fixed to said flange at the bottom of said panel and having projecting lips engaging the rear side of said rounded portions of said first brackets.

10. In a vehicle, a depending side wall having a wheel access opening therein, said opening being surrounded by a flange parallel to and offset in back of the main portion of said side wall, said side wall having rearwardly projecting flanges along the bottom at each side of said opening, a removable panel seated against said offset flange and covering said opening, said panel having a rearwardly projecting flange along the bottom, a bracket fixed to the back of said side wall above said opening and having an upwardly and rearwardly facing convex supporting surface whose axis of curvature extends parallel to said side wall above said panel, a hook fixed to said panel and extending up behind and over said supporting surface on said bracket, said hook having a surface slidably engaging said supporting surface for transferring the weight of said panel to said side wall and for holding the upper portion of said panel seated against said offset flange, a pair of one-piece brackets fixed to said flange at the bottom of said side wall at the sides of said opening and having rounded portions projecting behind said wheel access opening, and a second pair of one-piece brackets fixed to said flange at the bottom of said panel and having projecting lips engaging the rear side of said rounded portions of said first brackets, the brackets of said second pair being each fixed to said flange by a pivot located between said lip and the plane of said panel and by a bolt extending through said bracket and said flange, at least one of the holes for said bolt being large enough to permit angular adjustment of said bracket on said pivot.

11. In a vehicle having a fender shield closing a wheel access opening in a depending side wall and supported at the top of said opening, said side wall and said fender shield having inwardly projecting flanges at their bases, means for holding the lower part of said fender shield in against said side wall comprising a bracket fixed to said flange at the base of said side wall and having a rounded portion projecting behind said wheel access opening, and a second bracket fixed to said flange at the base of said panel and having a projecting lip engaging the rear side of said rounded portion of said first bracket, said second bracket being fixed to said flange on said fender shield by a pivot located between said lip and the plane of said panel and by a bolt extending through said bracket and said flange, at least one of the holes for said bolt being large enough to permit angular adjustment of said bracket on said pivot.

CHARLES F. PURDY.